US006587430B2

(12) United States Patent  
Nakata et al.

(10) Patent No.: US 6,587,430 B2
(45) Date of Patent: Jul. 1, 2003

(54) DISC CARTRIDGE ADAPTOR

(75) Inventors: Kuniko Nakata, Kadoma (JP); Yukio Nishino, Ikoma-gun (JP); Yoshikazu Goto, Hirakata (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 149 days.

(21) Appl. No.: 09/800,386

(22) Filed: Mar. 6, 2001

(65) Prior Publication Data

US 2001/0021168 A1 Sep. 13, 2001

(30) Foreign Application Priority Data

Mar. 7, 2000 (JP) .................................. 2000-061475

(51) Int. Cl.⁷ ............................................. G11B 23/00
(52) U.S. Cl. ............................................. 369/291
(58) Field of Search ................................. 369/291, 289; 360/132, 133

(56) References Cited

U.S. PATENT DOCUMENTS

| 5,923,630 A | | 7/1999 | Yoshida et al. | |
| 6,349,087 B1 | * | 2/2002 | Okamoto et al. | 360/133 |
| 6,407,981 B1 | * | 6/2002 | Cho et al. | 369/289 |
| 6,426,938 B2 | * | 7/2002 | Lim et al. | 369/291 |

FOREIGN PATENT DOCUMENTS

| EP | 0 961 272 A1 | 12/1999 |
| JP | 2000-040323 A | 2/2000 |

OTHER PUBLICATIONS

U.S. patent application No. 09/585,750.
U.S. patent application No. 09/586,933.

* cited by examiner

Primary Examiner—William Korzuch
Assistant Examiner—Jennifer M Dolan
(74) Attorney, Agent, or Firm—Akin, Gump, Strauss, Hauer & Feld, L.L.P.

(57) ABSTRACT

A disc cartridge adaptor for housing a information storage disc and a disc holder. The disc cartridge adaptor includes: a case body including a housing portion for rotatably housing the disc, and an opening communicating with the housing portion for allowing insertion and removal of the disc holder and the disc. A lid is pivotably supported by the case body. The housing portion is able to house the disc together with the disc holder or without the disc holder. The lid includes a positioning member movable between a first position and a second position with respect to the lid. The positioning member is in the first position restricting the position of the disc within a predetermined range when the disc is housed in the housing portion without the disc holder, and retreats to the second position when the disc holder is housed in the housing portion.

11 Claims, 13 Drawing Sheets

DISC CARTRIDGE ADAPTOR

BACKGROUND OF THE INVENTION

The present invention relates to a disc cartridge adaptor that enables a small-size disc-shaped information storage medium (hereinafter, simply referred to as a "disc") to be mounted in a disc drive intended for a disc larger than the small-size disc.

With rapid progress of computer technology, discs have been widely used for recording/reproducing various types of information. Discs comprise an information storage layer and a substrate supporting the information storage layer, and have a variety of standards defining the storage density, the size, the recording/reproduction method, and the like of the discs. For example, a disc having a diameter of 80 mm and a disc having a diameter of 120 mm are available. Since a disc is inserted into a recording/reproduction unit (disc drive or player) for recording, reproduction, and erasing of information, a variety of disc drives are available to comply with the variety of standards of discs.

Various types of disc cartridges also have been developed for housing a disc in a case to protect the record surface of the disc from contamination.

In the above situation, it will be convenient for users if discs having different sizes can be mounted in the same disc drive and used, by inserting the disc into a disc cartridge. To attain this, the following idea, for example, has been examined. That is, a small-size disc taken out from a small-size disc cartridge is housed in a cartridge adaptor having the same size and contour as those of a larger-size disc cartridge, and the disc-housing cartridge adaptor is mounted in a disc drive intended for a large-size disc cartridge for recording, reproduction, and erasing of information.

Hereinafter, a non-disclosed disc cartridge and disc cartridge adaptor prototyped by the present inventions before completion of the present invention will be described with reference to FIGS. 11 to 13.

FIGS. 11 and 12 illustrate a disc 1 having a diameter of 80 mm, a disc holder 75 for holding the disc 1, and a disc cartridge 70 into which the disc holder 75 holding the disc 1 is inserted. In FIG. 12, the upper half of a cartridge case 71 has been removed. The disc 1 is inserted into the disc cartridge 70 in the state of being held by the disc holder 75 and housed rotatably in a housing portion 72. A predetermined gap is secured between the housing portion 72 and the disc 1. The gap is designed so that free rotation of the disc 1 is ensured and that the disc 1 can be reliably placed on a motor and the like when the disc cartridge 70 is mounted in a disc drive.

The cartridge case 71 has an exposing portion 73, which is opened/closed with a shutter 74 slidable along the front end portion of the cartridge case 71.

The disc holder 75 is insertable into and removable from the cartridge case 71, and includes a holder body 76 and disc supports 77 extending from the holder body 76. Stop portions 78 are formed on both ends of the holder body 76 for retaining the disc holder 75 in the cartridge case 71. The stop portions 78 are elastically deformed by application of a force, and the retention of the disc holder 75 in the cartridge case 71 can be released by this elastic deformation.

The holder body 76 has a grip 81 in the center that is thicker than the other portion of the holder body 76. The grip 81 is designed so that the user can grasp the grip 81 when taking out the disc holder 75 from the cartridge case 71 and from a case body 91 of a disc cartridge adaptor 90 to be described later.

The disc supports 77 are shaped to surround part of the circumference of the disc 1 with the predetermined gap described above therebetween. Disc hold pieces 79 protrude from the disc supports 77 for holding the disc 1. Specifically, the disc hold pieces 79 protrude from the top and bottom surfaces of the disc supports 77 inward in a lateral direction, so that the disc 1 is prevented from slipping off from the disc holder 75 when the disc holder 75 is taken out from the cartridge case 71.

Next, the disc cartridge adaptor 90 will be described with reference to FIG. 13. The disc cartridge adaptor 90, which was designed by the present inventors, is intended to house the disc 1 and the disc holder 75 taken out from the disc cartridge 70 in the case body 91. The cartridge adaptor 90 has the same size and contour as those of a large-size disc cartridge for a 120 mm disc and thus can be mounted in a disc drive intended for the large-size disc cartridge.

An opening 92 is formed at the rear end face of the case body 91 for removably accepting the disc 1 and the disc holder 75. An exposing portion 93 extends from the center to the front end of the case body 91 in a disc radial direction, to allow an optical head and a disc motor not shown to enter the case body 91.

The case body 91 also has a guide wall 97 functioning as a guide for insertion of the disc holder 75. A shutter 94 for closing the exposing portion 93 is slidable along the front end portion of the case body 91 and is urged with an elastic member 95 in a direction in which the exposing portion 93 is closed.

An open/close lid 96 is pivotably attached to the case body 91. The open/close lid 96 closes the opening 92 after the disc holder 75 has been inserted into the case body 91 and also serves to place the disc holder 75 at a predetermined position in the case body 91.

The operation is as follows. The disc holder 75 is removed from the cartridge case 71 by grasping the stop portions 78 with fingers to apply a force inward and thus elastically deform the stop portions 78. During this removal, the disc 1 is also taken out from the cartridge case 71. The removed disc holder 75 holding the disc 1 is then inserted into the disc cartridge adaptor 90 through the opening 92. The disc holder 75 proceeds inside the case body 91 while being guided by the guide wall 97. The open/close lid 96 is then moved to close the opening 92. By this closing, the disc holder 75 is positioned inside the case body 91. Simultaneously, the disc 1 is also positioned.

When the resultant disc cartridge adaptor 90 is inserted into a disc drive intended for a large-size disc cartridge, the shutter 94 slides in association with the insertion movement, opening the exposing portion 93. A head enters the disc cartridge adaptor 90 through the exposing portion 93, to allow recording, reproduction, erasing of various type of information.

In the above construction, the disc supports 77 are elastically deformable. Therefore, the disc 1 is easily removed by elastically deforming the disc supports 77. With the disc supports 77 having small stiffness, however, the disc 1 may accidentally slip off from the disc holder 75.

In order to increase the stiffness of the disc supports 77 to prevent easy removal of the disc 1, the thickness of the disc supports 77 in the direction parallel to the principal surface of the disc 1 may be increased. However, increase in this thickness inevitably increases the size of the disc cartridge 70, and thus fails to realize a practical disc cartridge.

Moreover, if the stiffness of the disc supports 77 is increased, it becomes difficult for the disc 1 to pass between the disc hold pieces 79 to be placed inside the disc supports 77 when the disc 1 is incorporated in the disc supports 77.

In view of the above, the disc supports 77 must be provided with elasticity large enough for the disc 1 to be removed. This causes the possibility that the user may remove the disc 1 from the disc holder 75 after the disc holder 75 is removed from the disc cartridge 70. There also arises the possibility that the user may insert the disc 1 into the disc cartridge adaptor 90 directly without being held by the disc holder 75 and close the open/close lid 96 with the disc 1 alone housed inside. In this case, although the movement of the disc 1 inside is restricted by the case body 91 and the open/close lid 96, a large gap is formed due to the absence of the disc holder 75.

Therefore, the disc cartridge adaptor 90 described above has a problem that it may fail to place the disc 1 in position.

There is also the possibility that the user may insert the disc 1 alone into the disc cartridge adaptor 90 and afterward insert the disc holder 75 into the disc cartridge adaptor 90. In this event, the disc holder 75 must be inserted smoothly so that it can properly hold the disc 1 inside.

The disc cartridge adaptor 90 has another problem that the disc holder 75 and the disc 1 may drop off from the disc cartridge adaptor 90 when the lid 96 is opened.

An object of the present invention is to provide a disc cartridge adaptor operable even when the user removes a disc from a disc holder and inserts the disc alone into the disc cartridge adaptor or when the user inserts a disc alone into the disc cartridge adaptor and afterward inserts a disc holder.

Another object of the present invention is to provide a disc cartridge adaptor that prevents a disc holder and a disc from dropping off from the disc cartridge adaptor when the disc holder is removed from the disc cartridge adaptor.

SUMMARY OF THE INVENTION

The disc cartridge adaptor of the present invention is a disc cartridge adaptor for housing an information storage disc and a disc holder holding at least part of the disc, the disc holder being removably housed in a disc cartridge case. The disc cartridge adaptor includes: a case body including a housing portion for rotatably housing the disc, an exposing portion for exposing at least part of a recording surface of the housed disc, and an opening communicating with the housing portion for allowing insertion and removal of the disc holder and the disc; and a lid pivotably supported by the case body, the lid blocking the opening, wherein the housing portion can house the disc together with the disc holder or without the disc holder, the lid includes disc positioning means having a positioning member movable between a first position and a second position with respect to the lid, and the positioning member is in the first position restricting the position of the disc within a predetermined range when the disc is housed in the housing portion without the disc holder, and retreats to the second position when the disc holder is housed in the housing portion.

In a preferred embodiment, the disc positioning means has an elastic member urging the positioning member toward the first position from the second position.

In another preferred embodiment, the positioning member is at least one pin movably supported by the lid.

In still another preferred embodiment, the first position is determined so that a gap is formed between the positioning member and the disc when the disc is housed in the housing portion without the disc holder and rotated with a disc drive.

In still another preferred embodiment, the top end of the positioning member has been moved backward from the first position by the disc holder when the disc holder is housed in the housing portion and the lid closes the opening of the case body.

In still another preferred embodiment, the case body includes a pair of movable members movable in a direction of insertion of the disc, and the movable members can grasp the disc holder inserted into the case body.

In still another preferred embodiment, each of the movable members has a pivot plate having a protrusion engaging with a recess formed on a side face of the disc holder, and when the disc holder is inserted into the case body beyond a predetermined distance, the engagement between the protrusion of the movable member and the recess of the disc holder is established by operation of the pivot plate.

In still another preferred embodiment, the movable member has an elastic member urging the movable member in a direction opposite to the direction of insertion of the disc, and the elastic member urges the disc holder grasped by the movable member when the disc holder is removed from the case body.

In still another preferred embodiment, the case body includes a press member for pressing the disc holder toward either one of principal surfaces of the case body for positioning of the disc holder.

In still another preferred embodiment, the housing portion of the case body has a shape and size capable of housing a disc having a diameter of 80 mm, and the outside shape and size of the case body is substantially the same as the shape and size of a disc cartridge capable of housing a disc having a diameter of 120 mm.

In still another preferred embodiment, the case body has means for preventing the disc holder from being inserted upside-down into the case body.

DETAILED DESCRIPTION OF THE INVENTION

Figure 11:
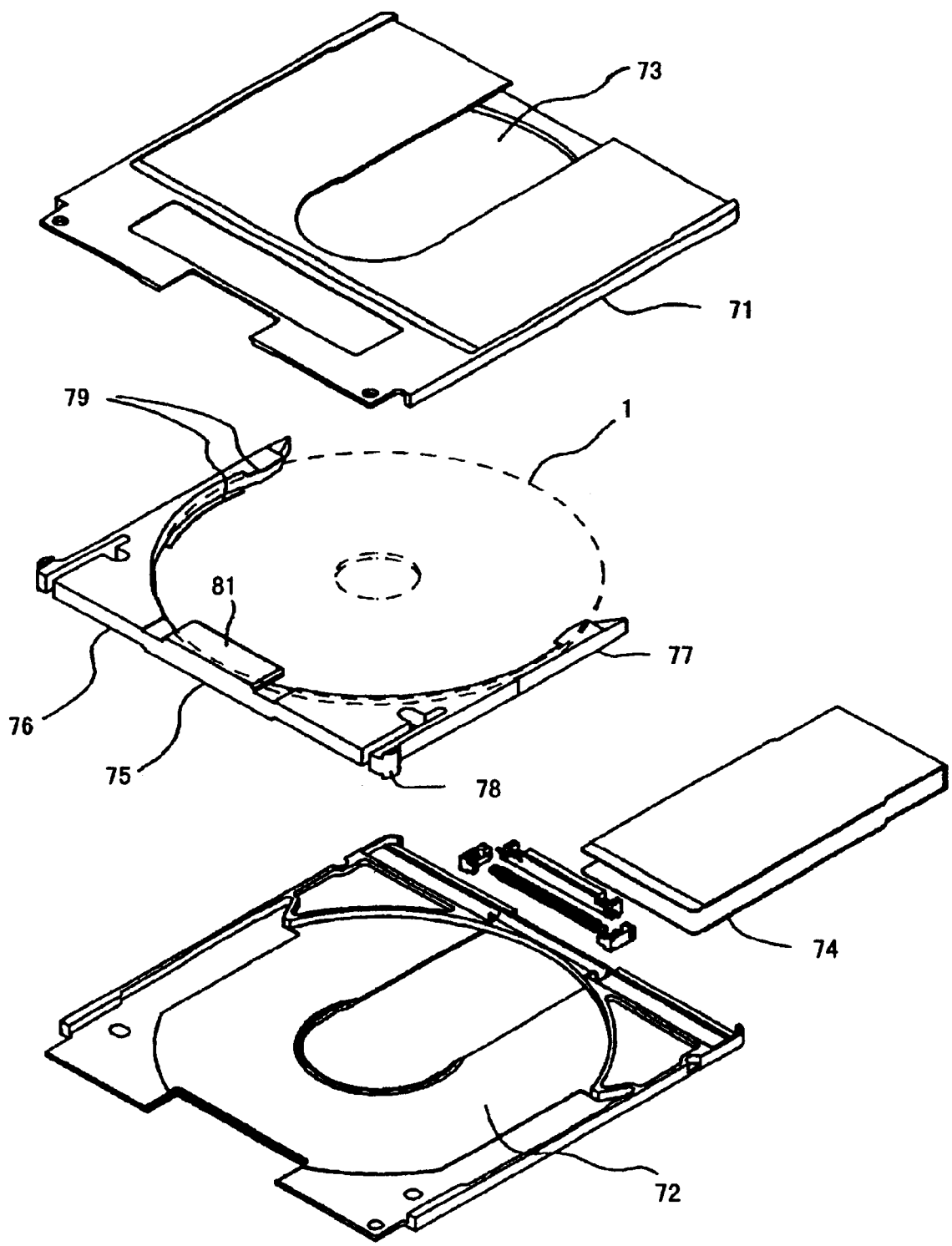
FIG. 11 is an exploded perspective view of a disc cartridge.
Figure 12:
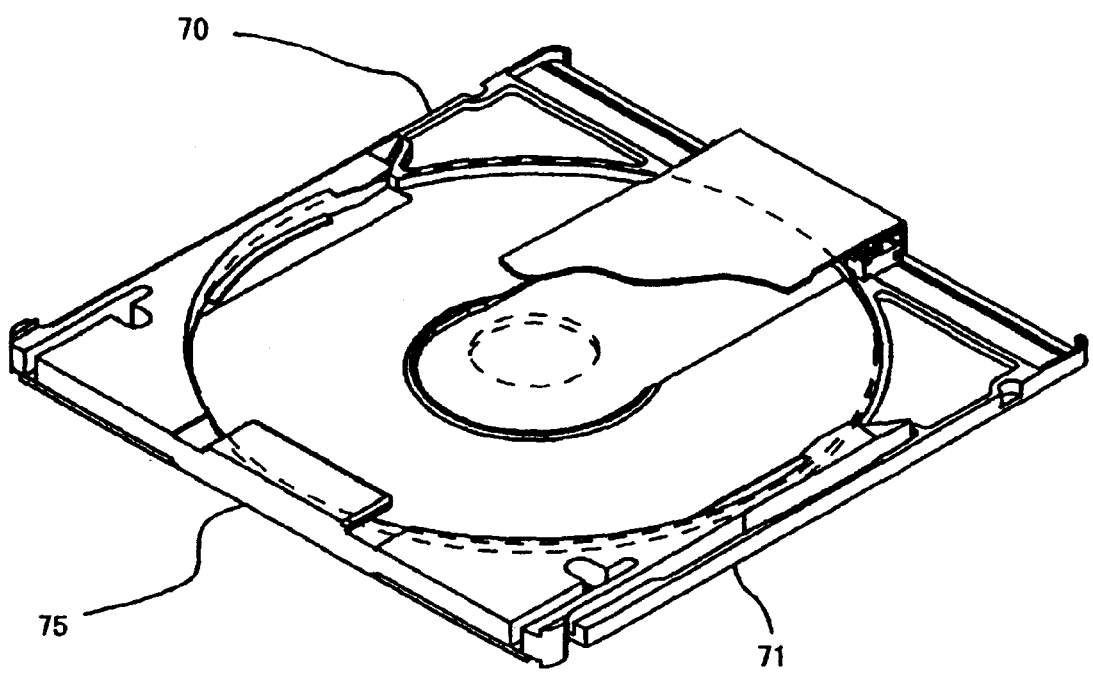
FIG. 12 is a schematic perspective view of the disc cartridge shown in FIG. 11.

The disc cartridge adaptor of the present invention can house a disc and/or a disc holder removed from the disc cartridge 70 for an 80 mm disc as shown in FIG. 11, for example. The disc cartridge adaptor of the present invention has the same size and contour as those of a disc cartridge for a 120 mm disc, for example. Using this disc cartridge adaptor of the present invention, therefore, it is possible to record, reproduce, and erase information on and from a small-size disc with a disc drive intended for a large-size disc cartridge.

Hereinafter, an embodiment of the disc cartridge adaptor of the present invention will be described with reference to the relevant drawings.

Figure 1:
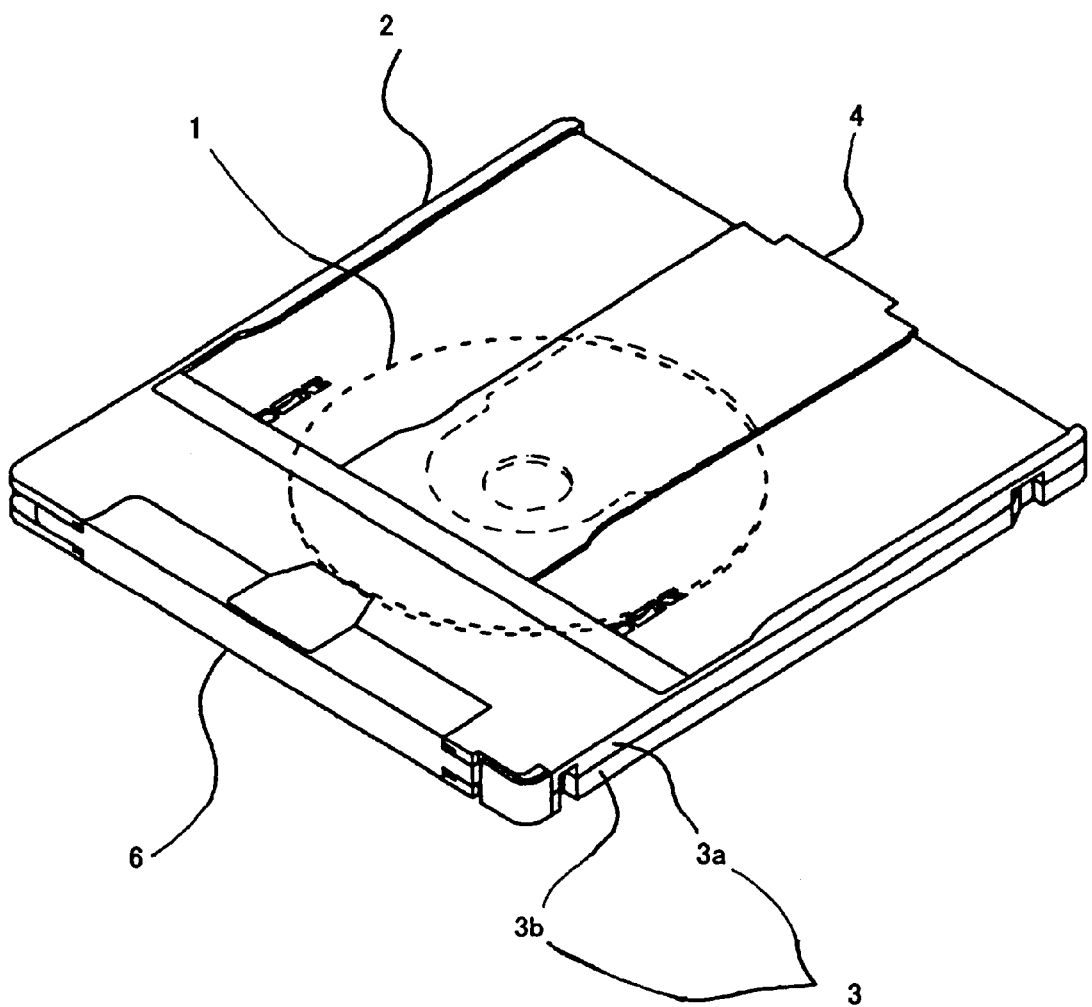
FIG. 1 is a perspective view of the appearance of a disc cartridge adaptor of the present invention.
Figure 2:
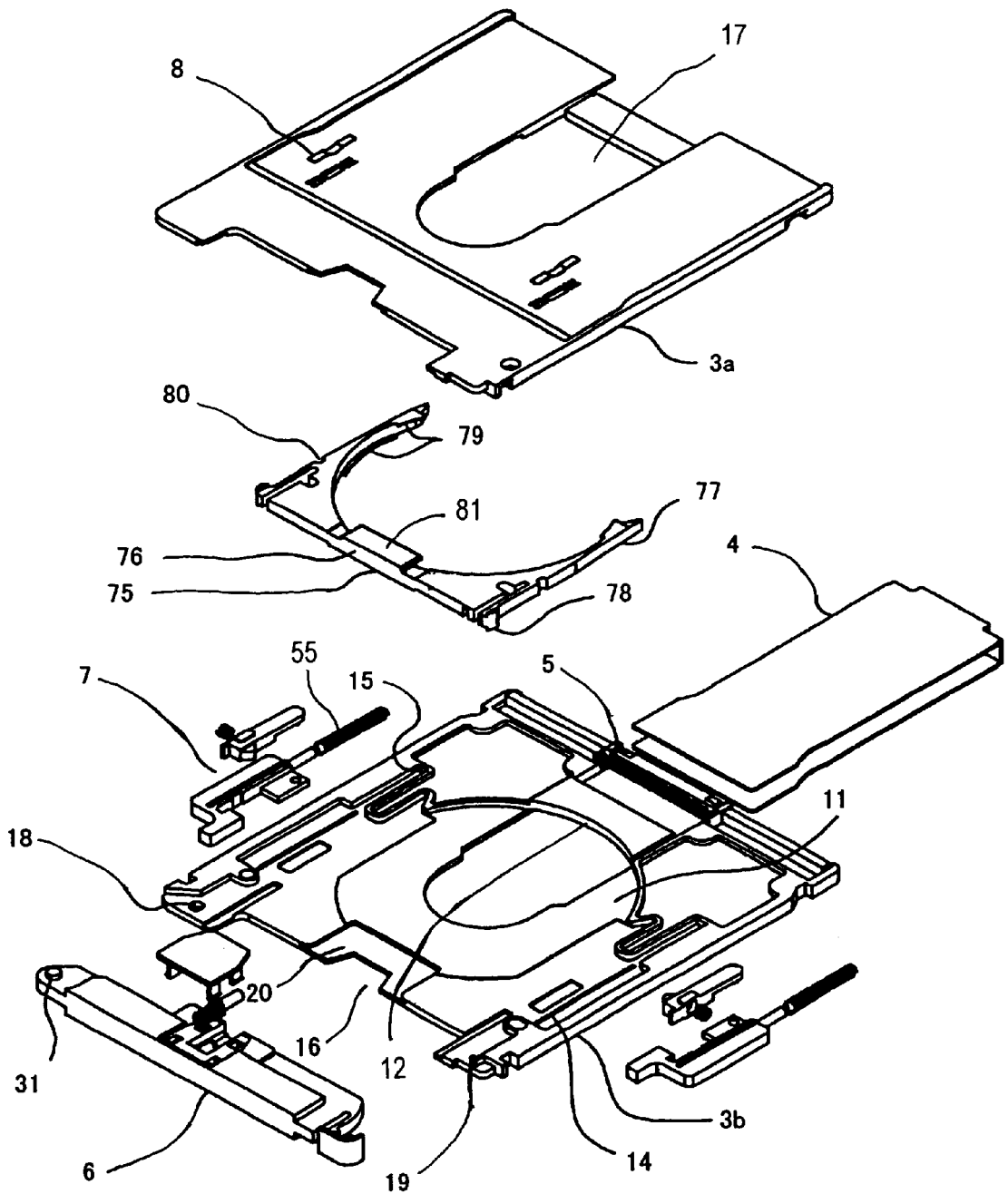
FIG. 2 is an exploded perspective view of the disc cartridge adaptor of the present invention.

Referring to FIGS. 1 and 2, a disc cartridge adaptor 2 of this embodiment includes a case body 3 having: a housing portion 11 for housing the disc 1; an opening 16 communicating with the housing portion 11, through which the disc 1 is inserted and removed; and an exposing portion 17 for exposing at least part of the recording surface of the disc 1 housed. The case body 3 is in the shape of a box essentially composed of an upper case body 3a and a lower case body 3b.

The housing portion 11 has a shape and size suitable for housing the disc 1 and the disc holder 75 in the case body 3. The housing portion 11 includes a partition wall 12 curved to follow the contour of the disc 1. Stop walls 13 are formed at both ends of the partition wall 12 so as to abut against the top ends of the disc supports 77. Guide grooves 14 are formed on both sides of the case body 3 for guiding movement of movable members 7 to be described later. Suspension walls 15 are formed on the side of the guide grooves 14 closer to the front end of the case body 3 for suspending elastic members 55 to be described later.

The opening 16 is formed in the rear end portion of the case body 3 so that the disc 1 and the disc holder 75 can be inserted and removed therethrough. In the rear end portion of the case body 3, also formed are a pivot hole 18 for pivotal movement of an open/close member (lid) 6 to be described later at one end and a lock portion 19 for locking the lid 6 at the other end.

A concave or recessed portion 20 is formed in roughly the center of the rear end portion of each of the upper and lower case bodies 3a and 3b. The concave portion 20 is recessed by one step from the other portion and is shaped to match with the grip 81 of the disc holder 75.

The exposing portion 17 is formed by cuts formed in the upper and lower case bodies 3a and 3b, extending from the center of the housing section 11 to the front end. An optical head (not shown) enters through the exposing portion 17 to access the recording surface of the disc 1 for executing recording, reproduction, and erasing of various types of information. The exposing portion 17 is opened/closed with a shutter 4 slidable along the front end portion of the case body 3. The shutter 4 is urged with an elastic member 5 in a direction in which the exposing portion 17 is closed. With the urging force of the elastic member 5, the shutter 4 normally closes the exposing portion 17 to protect the housing portion 11 against intrusion of dust and the like. When the disc cartridge adaptor 2 is inserted into a recording/reproduction unit, the shutter 4 slides to open the exposing portion 17. Through the opened exposing portion 17, a disc motor for rotating the disc 1 enters.

Press members 8 made of an elastically deformable leaf spring are provided on the upper case body 3a. The press members 8 press the inserted disc holder 75 toward the lower case body 3b to eliminate a gap between the inner surface of the lower case body 3b and the bottom surface of the disc holder 75, and thus contribute to the positioning of the disc holder 75. This makes it possible to accurately set the positional relationship between the case body 3 and the disc 1.

Open/Close Member

Figure 3:
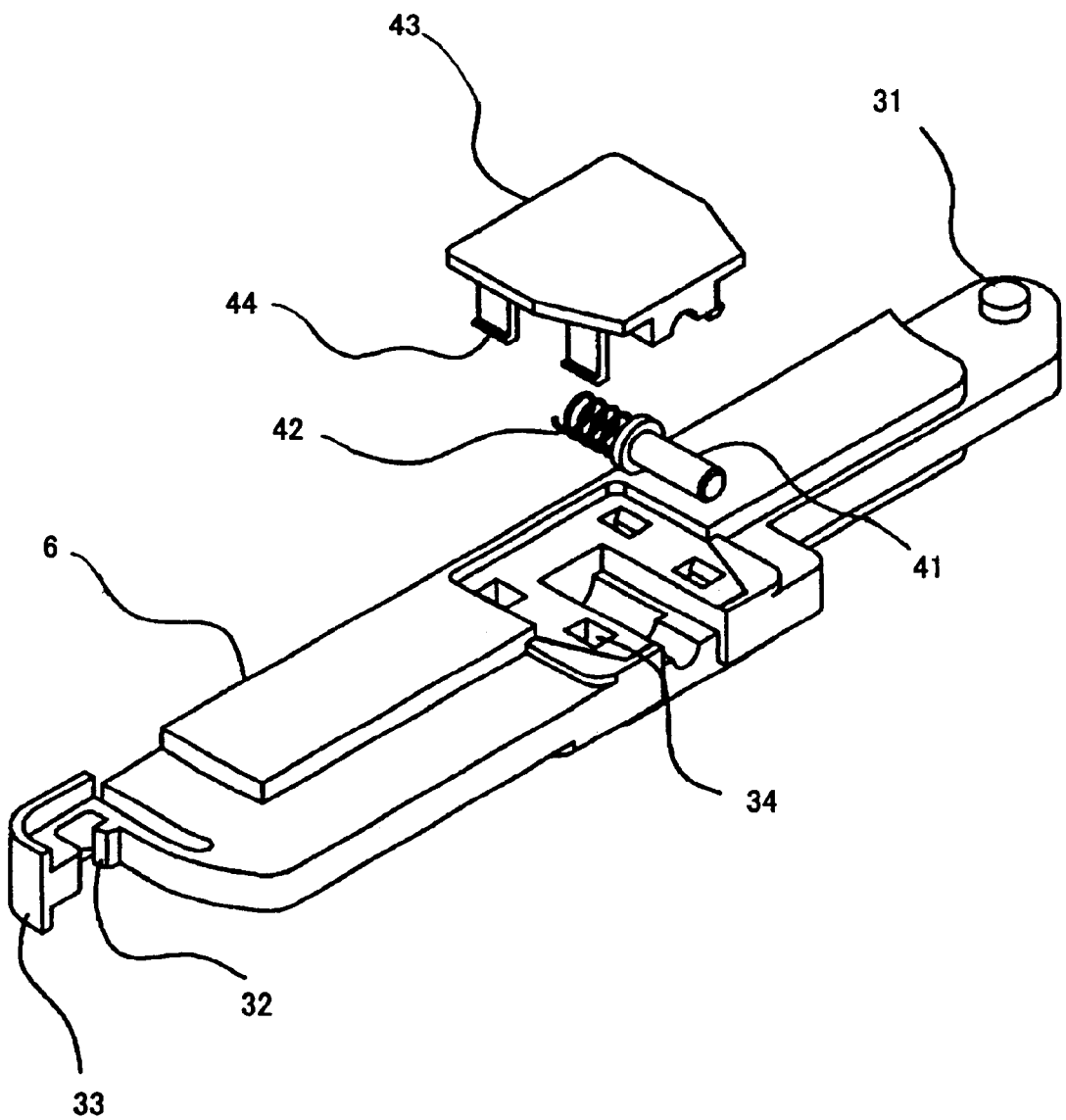
FIG. 3 is an exploded perspective view of a lid used for the disc cartridge adaptor shown in FIGS. 1 and 2.

The lid 6 for opening/closing the opening 16 will be described. Referring to FIGS. 2 and 3, the lid 6 is pivotably held with a pivot 31 that fits in the pivot hole 18 of the case body 3. A protrusion 32 that engages with the lock portion 19 of the case body 3 is formed at the end of the lid 6 opposite to the pivot 31. A press portion 33 is formed at a position facing the top end of the protrusion 32.

The protrusion 32 is elastically deformable. By pressing the press portion 33, therefore, engagement between the protrusion 32 of the lid 6 and the lock portion 19 of the case body 3 can be released.

As is most clearly shown in FIG. 3, the lid 6 has a recess in the center, in which a positioning pin 41 is movably housed. The positioning pin 41 is made of a plastic material and has a size of 9 mm in length and 3 mm in diameter. An elastic member 42 is attached to the base of the positioning pin 41 to urge the positioning pin 41 in the protruding direction. In this embodiment, a compression coil spring is used as the elastic member 42.

The positioning pin 41 and the elastic member 42 are placed in the recess of the lid 6, and then an auxiliary plate cover 43 is fitted in the recess. The auxiliary plate cover 43 is provided with a plurality of stop pawls 44, which pass through corresponding openings while being elastically deformed. Once the elastic deformation of the stop pawls 44 is released, the auxiliary plate cover 43 is secured to the lid 6. The positioning pin 41 is restrained by the auxiliary plate cover 43 from being detached from the lid 6, but can move in the protruding direction. Normally, the top end of the positioning pin 41 is in its forward position in the protruding direction from the lid 6 with the urging force of the elastic member 42. Once some force is applied to push back the positioning pin 41, the top end of the positioning pin 41 moves toward the lid 6. The distance of this movement is 3 to 4 mm, for example.

The positioning pin 41, the elastic member 42, and the auxiliary plate cover 43 constitute a means for positioning the disc 1 when the disc 1 alone is inserted into the disc cartridge adaptor 2.

Figure 5:
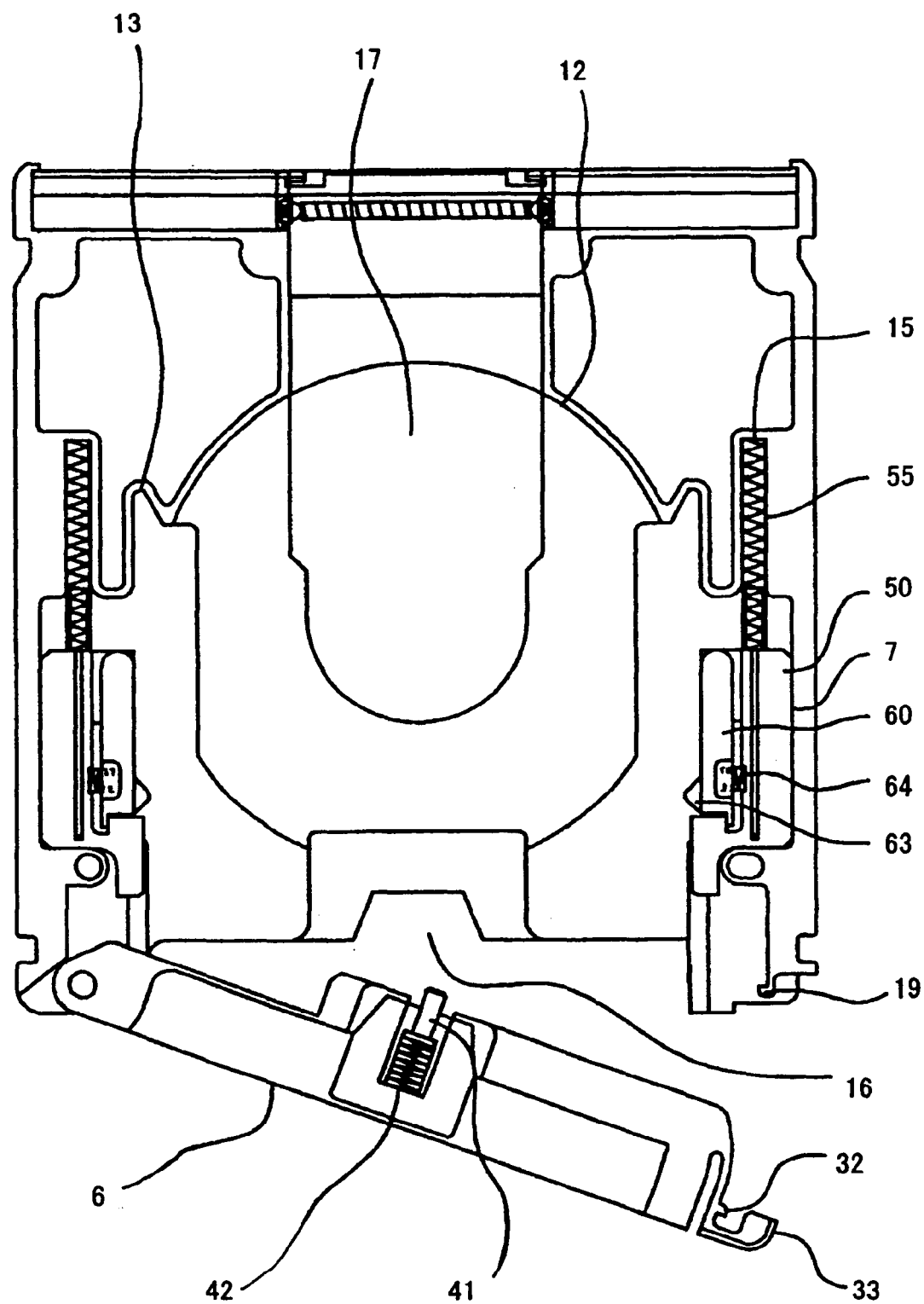
FIG. 5 is a schematic plan view of the disc cartridge adaptor of the present invention.
Figure 6:
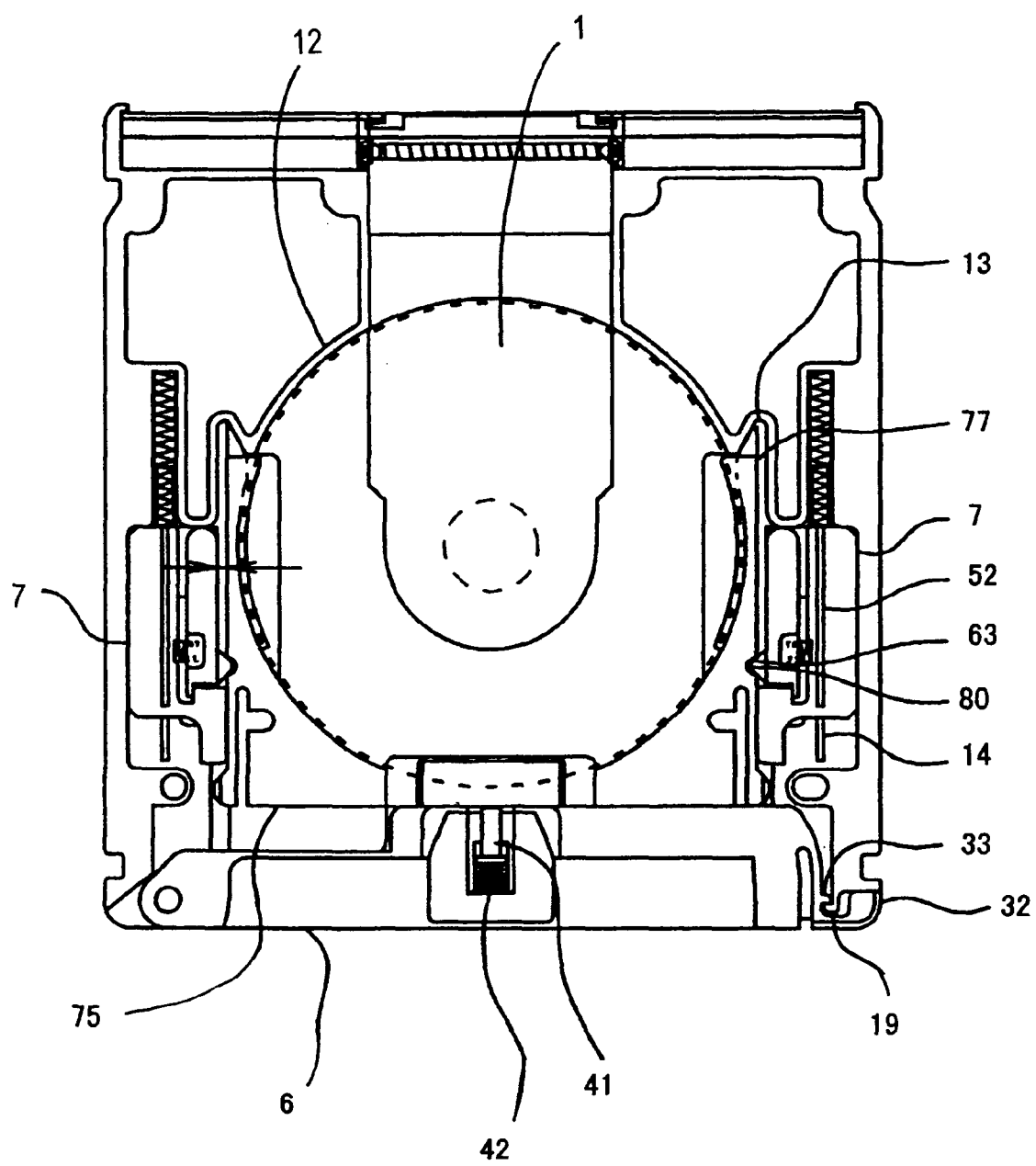
FIG. 6 is a view of the disc cartridge adaptor of the present invention with a disc holder and a disc housed therein.

The positioning pin 41 projects most with the urging force of the elastic member 42 in the state shown in FIG. 5. In the state shown in FIG. 6, contrarily, the positioning pin 41 has been pushed back by the rear end face of the disc holder 45. FIG. 6 illustrates the state of the lid 6 closing the opening 16 after the disc holder 75 has been inserted into the case body 3. The lid 6 in this state contributes to the positioning of the disc holder 75 with respect to the case body 3. That is, once the lid 6 is closed, a gap of about 0.5 to 1 mm is formed between the circumference of the disc 1 and the partition wall 12 of the disc cartridge adaptor 2 and between the circumference of the disc 1 and the disc supports 77 of the disc holder 75. With the existence of the gap, the disc 1 is made rotatable.

Figure 7:
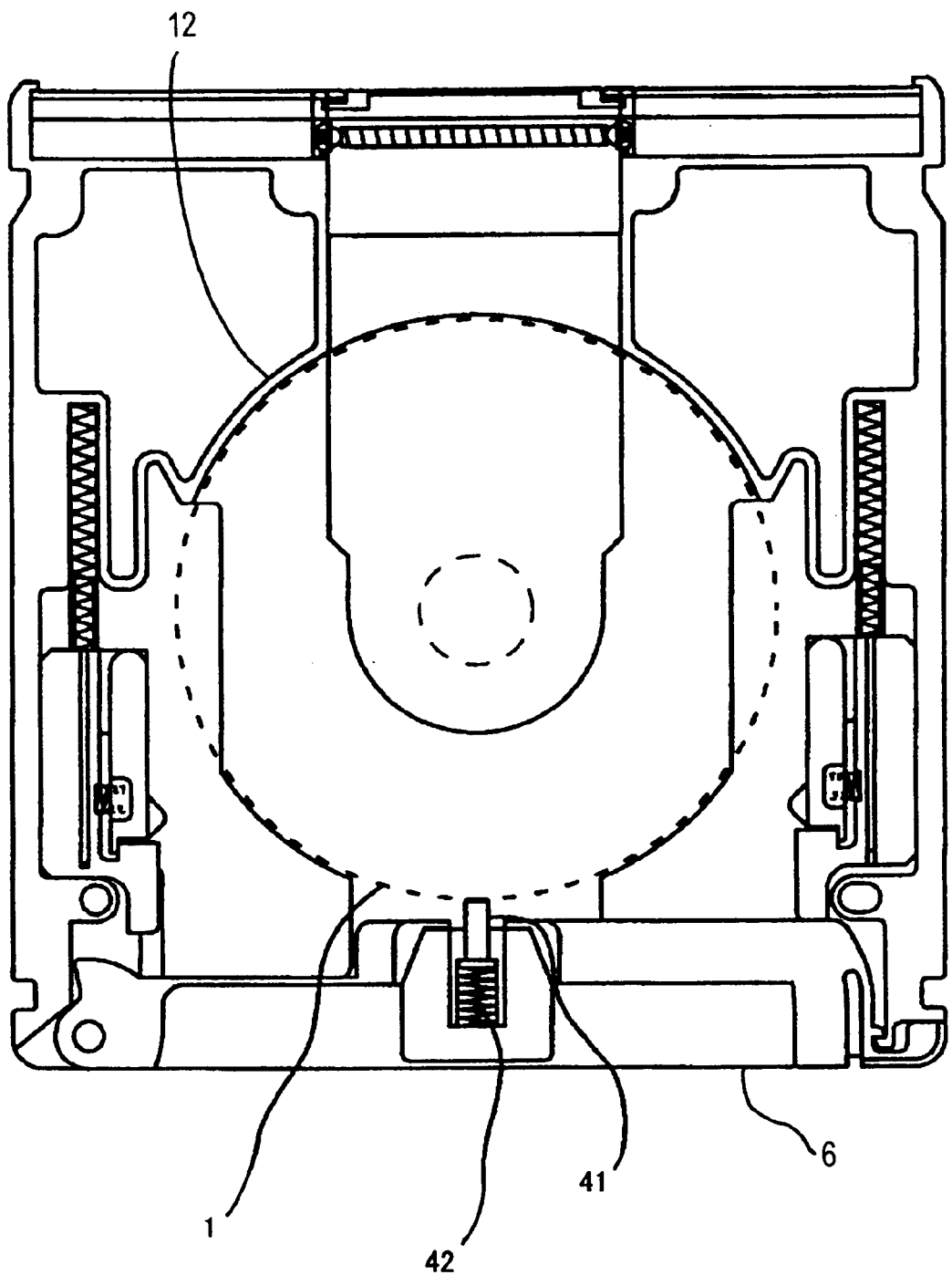
FIG. 7 is a view of the disc cartridge adaptor of the present invention with a disc housed therein.

In the case where the disc 1 alone is housed in the case body 3 without being held by the disc holder 75, as shown in FIG. 7, the lid 6 contributes to the positioning of the disc 1 when it closes the opening 16. That is, once the lid 6 is closed, a gap of about 0.5 to 1 mm is formed between the circumference of the disc 1 and the partition wall 12 of the disc cartridge adaptor 2 and between the circumference of the disc 1 and the positioning pin 41. With the existence of the gap, the disc 1 is made rotatable.

In this embodiment, one positioning pin 41 is provided. The present invention is not restricted to this, but a plurality of positioning pins may be provided. A member having a shape other than the pin shape may also be used as the positioning member. In the case of using a plate positioning member, the positioning member may have a curved top end having substantially the same curvature as that of the circumference of the disc 1. The positioning means may be placed in a portion of the lid 6 other than the center. The positioning member preferably moves toward the center of the disc 1 housed in the case body 3 when the lid 6 closes the opening 16 of the case body 3, but does not necessarily move in a direction normal to the lid 6.

Movable Member

The movable members 7 will be described. As is most clearly shown in FIG. 5, the movable members 7 are movable in the disc insertion direction and are disposed near the two side faces of the case body 3.

In this embodiment, the two movable members 7 grasp the side faces of the disc holder 75 inserted into the case body 3. The disc holder 75 and the disc 1 are therefore prevented from dropping off from the disc cartridge adaptor 2.

In the case of removal of the disc holder 5 with the disc 1 from the disc cartridge adaptor 2, once the locking of the lid 6 is released, the movable members 7 grasping the disc holder 75 move toward the opening 16 with the urging force of the elastic members 55. With this movement of the movable members 7, the rear end face of the disc holder 75 is made apart from the rear end face of the case body 3 by the amount of this movement. This facilitates the removal of the disc holder 75 and the disc 1.

Figure 4:
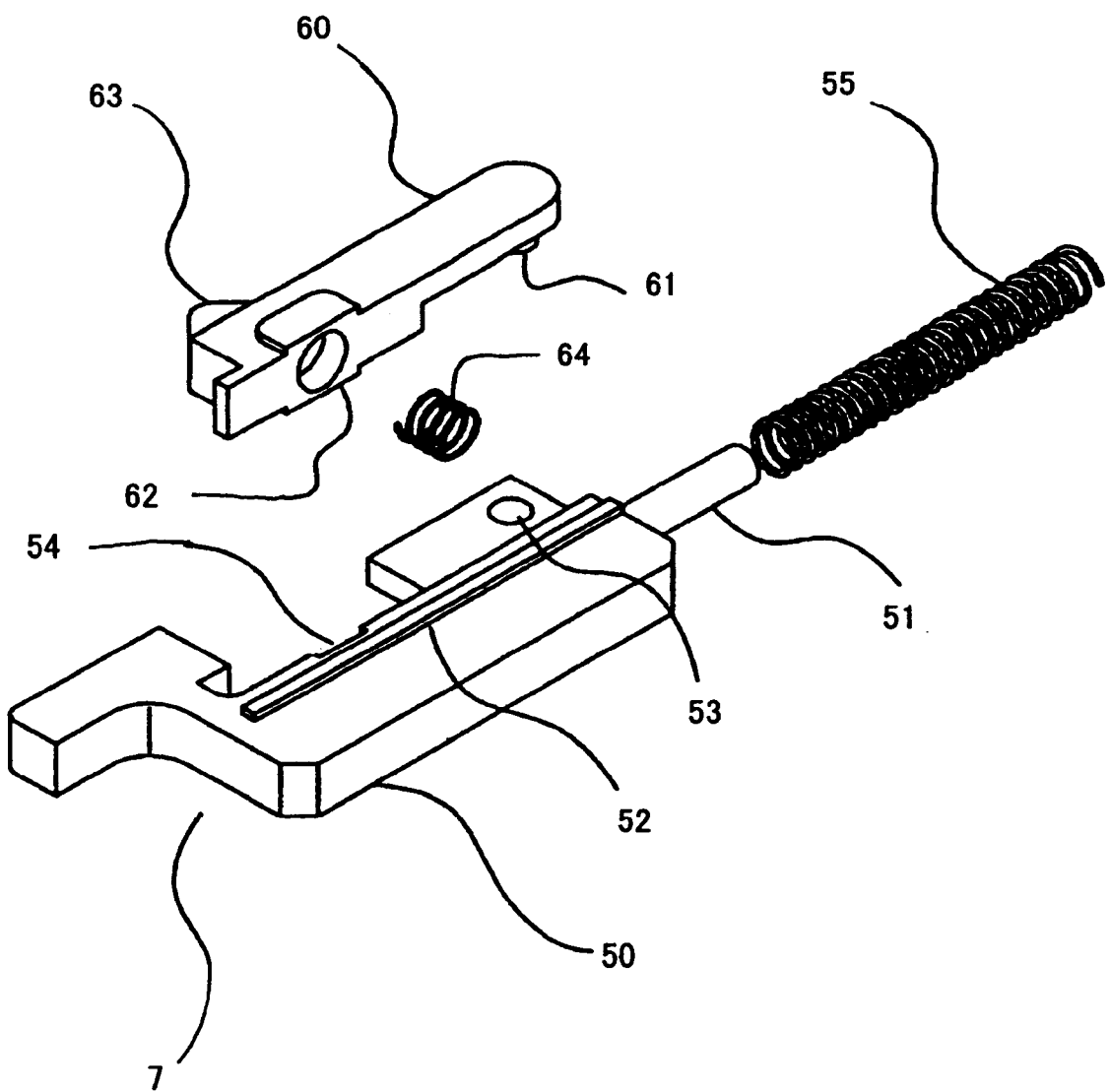
FIG. 4 is an exploded perspective view of a movable member used for the disc cartridge adaptor shown in FIGS. 1 and 2.

Referring to FIG. 4, the construction of the movable member 7 will be described in detail. The movable member 7 includes a movable plate 50, a pivot plate 60, the elastic member 55, and a press member 64.

The movable plate 50 is a plate member having a convex guide 52 (height 1 mm, width 1 mm, length 30 mm) in the center and a suspension bar 51 for suspending the elastic member 55 at one end. The movable plate 50 is made of plastic materials, for example. A pivot hole 53 is formed on the top surface of the movable plate 50 for pivotably supporting the pivot plate 60. A suspension recess 54 is formed on a side face of the movable plate 50 for suspending the press member 64. The convex guide 52 of the movable plate 50 fits in the guide groove 14 of the case body 3 shown in FIG. 2 for guiding the movement of the movable member 7 in the disc insertion direction.

The pivot plate 60 is a plate member pivotably attached to the movable plate 50. A pivot 61 protrudes from the pivot plate 60 at one end to fit in the pivot hole 53 of the movable plate 50, so that the pivot plate 60 can pivot around the pivot 61. The pivot plate 60 moves together with the movement of the movable plate 50.

A suspension recess 62 is formed on a side face of the pivot plate 60 for suspending the press member 64, and a grasp protrusion 63 is formed on the opposite side face. The grasp protrusion 63 engages with a semicircular cut 80 formed on the disc holder 75 when the disc holder 75 is inserted into the disc cartridge adaptor 2, and thus the disc holder 75 is grasped.

The press member 64 is a compression coil spring suspended between the suspension recess 54 of the movable plate 50 and the suspension recess 62 of the pivot plate 60. The press member 64 urges the pivot plate 60 toward the center of the disc cartridge adaptor 2, to allow the grasp protrusion 63 to engage with the cut 80 of the disc holder 75.

The elastic member 55 is a compression coil spring suspended between the suspension bar 51 of the movable plate 50 and the suspension wall 15 of the case body 3, and urges the movable plate 50 in the direction opposite to the disc insertion direction. The elastic member 55 moves the movable member 7 toward the opening 16 together with the disc holder 75 grasped by the movable member 7 when the locking of the lid 6 is released to remove the disc holder 75 from the disc cartridge adaptor 2.

Operation

The operation of inserting the disc holder 75 holding the disc 1 into the disc cartridge adaptor 2 will be described.

First, the stop portions 78 of the disc holder 75 shown in FIG. 11 are grasped with fingers and pressed inward. This elastically deforms the stop portions 78 and thus permits the disc holder 75 to be taken out from the cartridge case 71. The disc 1 is also taken out together with the disc holder 75.

Figure 8:
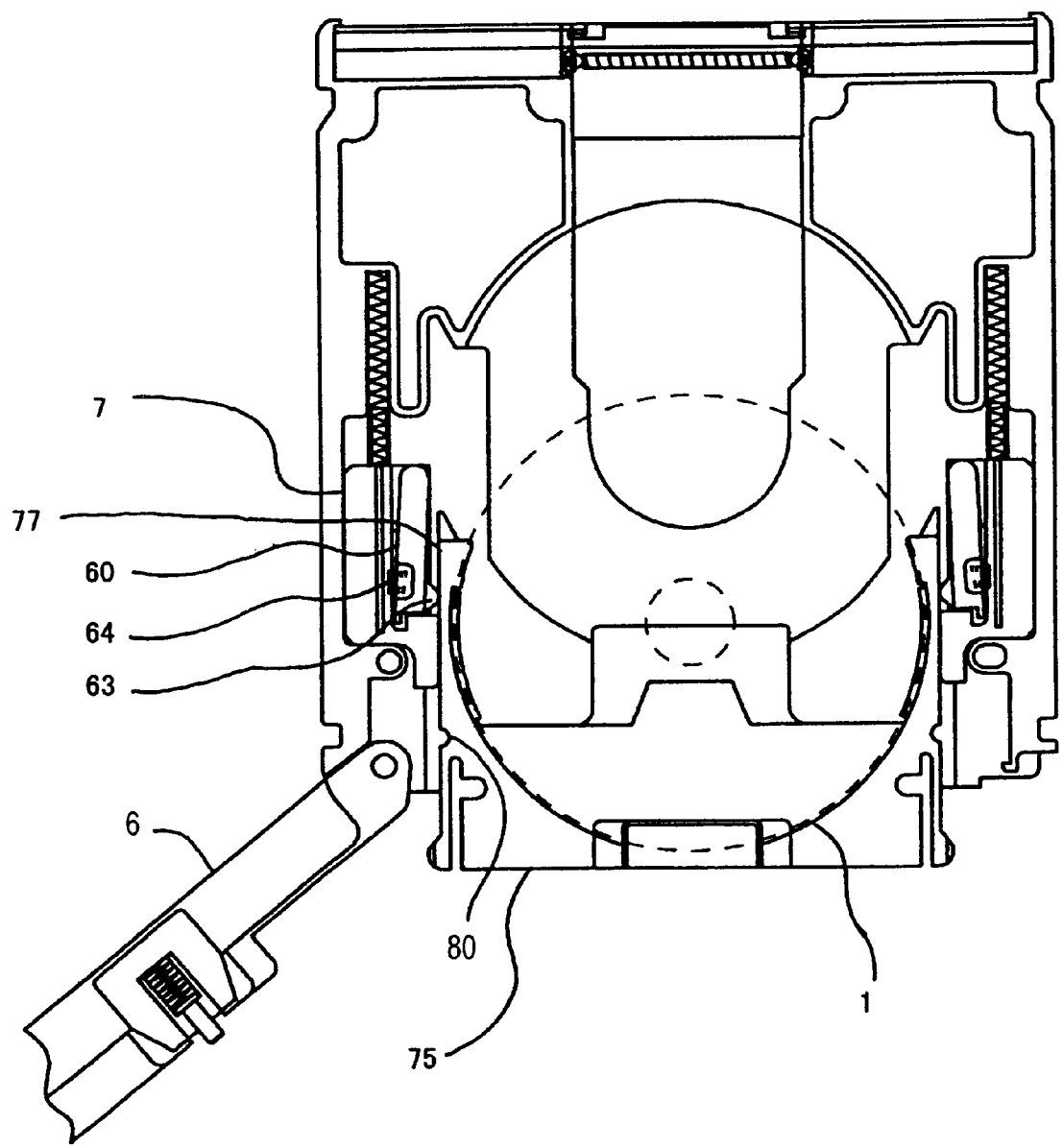
FIG. 8 is a view of the disc cartridge adaptor of the present invention with a disc holder and a disc inserted halfway.

Thereafter, as shown in FIG. 5, the lid 6 of the disc cartridge adaptor 2 is pivotally moved to open the opening 16. As shown in FIG. 8, the disc holder 75 holding the disc 1 is inserted into the disc cartridge adaptor 2 through the opening 16. Inside the disc cartridge adaptor 2, the disc holder 75 holding the disc 1 passes between the two movable members 7 disposed on both sides of the disc cartridge adaptor 2 toward the deep of the case body 3 while being guided by the movable members 7. In the course of the passing, the top ends of the disc holder 75 come into contact with the grasp protrusions 63 formed on the pivot plates 60 of the movable members 7. As the disc holder 75 is further pushed, the pivot plates 60 are pivotally moved outward with respect to the disc cartridge adaptor 2 against the urging force of the press members 64, allowing the disc holder 75 to pass over the grasp protrusions 63. The grasp protrusions 63 finally engage with the cuts 80 of the disc holder 75. The pivot plates 60 then resume the original position with the urging force of the press member 64. Thus, the disc holder 75 and the disc 1 are grasped free from dropping off from the disc cartridge adaptor 2.

Subsequently, the lid 6 is pivotally moved around the pivot hole of the case body 3. During this pivotal movement, the side face of the lid 6 comes into contact with the rear end face of the disc holder 75. As the lid 6 is further moved, the disc holder 75 holding the disc 1 and the movable members 7 are pushed toward the deep of the case body 3 against the urging force of the elastic member 55. During this movement, the positioning pin 41 protruding from the lid 6 comes into contact with the rear end face of the disc holder 75. The positioning pin 41 then retreats into the inside of the lid 6 against the urging force of the elastic member 42.

The protrusion 32 of the lid 6 then comes into contact with the lock portion 19 of the case body 3, and passes over the lock portion 19 while being elastically deformed. When the lid 6 is tightly attached to the case body 3, the protrusion 32 is released from the elastic deformation, and thus the lid 6 is locked to the case body 3 with the lock portion 19. FIG. 6 shows the state of completion of this locking.

Once the disc holder 75 holding the disc 1 has been inserted into the case body 3 in the manner described above, the top ends of the disc supports 77 of the disc holder 75 are placed in position in the case body 3 by abutting against the stop walls 13 of the case body 3. The disc holder 75 is placed in position with no gap between the bottom surface thereof and the inner surface of the lower case body 3b by being pressed with the press members 8. The disc 1 is also placed in position with the partition wall 12 of the case body 3 and the disc supports 77 of the disc holder 75 with a predetermined gap between the disc 1 and these members.

Figure 10:
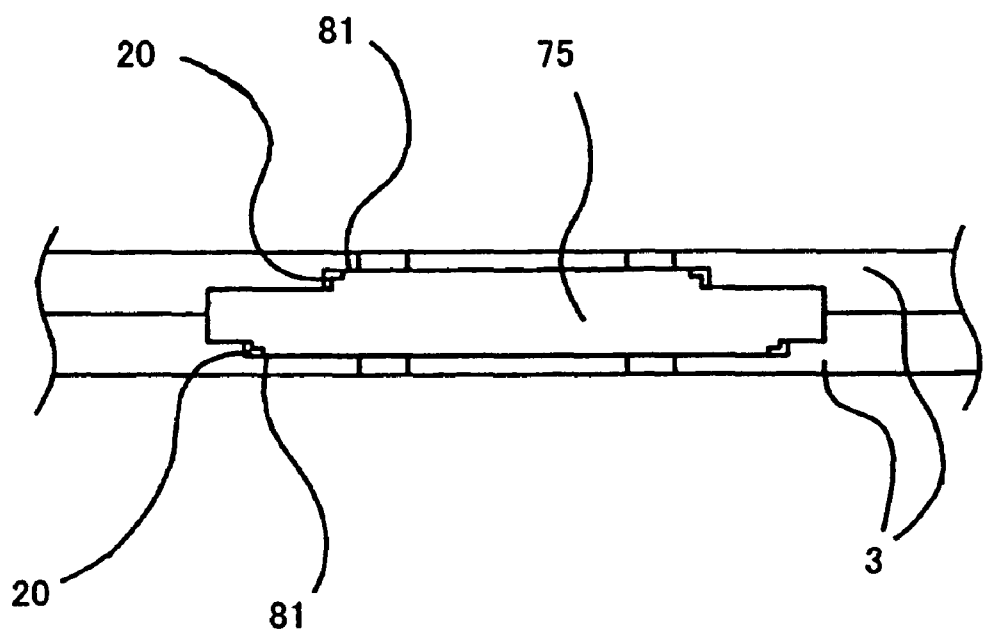
FIG. 10 is a view illustrating an asymmetric opening of the disc cartridge adaptor.

In this embodiment, the concave portions 20 are formed in roughly the center of the rear end portions of the upper and lower case bodies 3a and 3b as described above (see FIG. 2). The cross-section of the concave portions 20 is shown in FIG. 10, where the disc holder 75 has been completely inserted into the case body 3. As is observed from FIG. 10, the concave portions 20 of the upper and lower case bodies 3a and 3b are different in size from each other. More specifically, the size of the concave portion 20 of the upper case body 3a in the lateral direction is smaller than that of the concave portion 20 of the lower case body 3b. For example, the sizes of the concave portions 20 of the upper and lower case bodies 3a and 3b in the lateral direction are 23 mm and 33 mm, respectively. Therefore, the cross-section of the opening shown in FIG. 10 is vertically asymmetric. To match with this asymmetric cross-section of the opening of the case body, the cross-section of the grip 81 of the disc holder 75 is also vertically asymmetric. As a result, if it happens that the disc holder 75 is inserted upside down, the end face of the grip 81 collides with the end face of the upper case body 3a having a smaller concave portion 20, blocking the disc holder 75 from further entering the case body 3.

Thus, in this embodiment, where the opening has an asymmetric cross-section and the shape of the grip 81 of the disc holder 75 is designed to match with this asymmetric cross-section, upside-down insertion of the disc holder 75 is protected.

Next, the operation of inserting the disc 1 alone into the disc cartridge adaptor 2 will be described.

First, as shown in FIG. 7, the disc 1 is inserted into the disc cartridge adaptor 2 through the opening 16 to be housed in the case body 3. Then, as the lid 6 pivotally moved around the pivot hole of the case body 3, the protrusion 32 of the lid 6 comes into contact with the lock portion 19 of the case body 3 and passes over the lock portion 19 while being elastically deformed. When the lid 6 is tightly attached to the case body 3, the protrusion 32 is released from the elastic deformation, and thus the lid 6 is locked to the case body 3 with the lock portion 19. In this state, the disc 1 is rotatably placed in position with the partition wall 12 of the case body 3 and the positioning pin 41 of the lid 6 with a predetermined gap between the disc 1 and these members.

Next, described will be the operation of inserting the disc holder 75 into the disc cartridge adaptor 2 after the disc 1 alone has been inserted into the disc cartridge adaptor 2.

Figure 9:
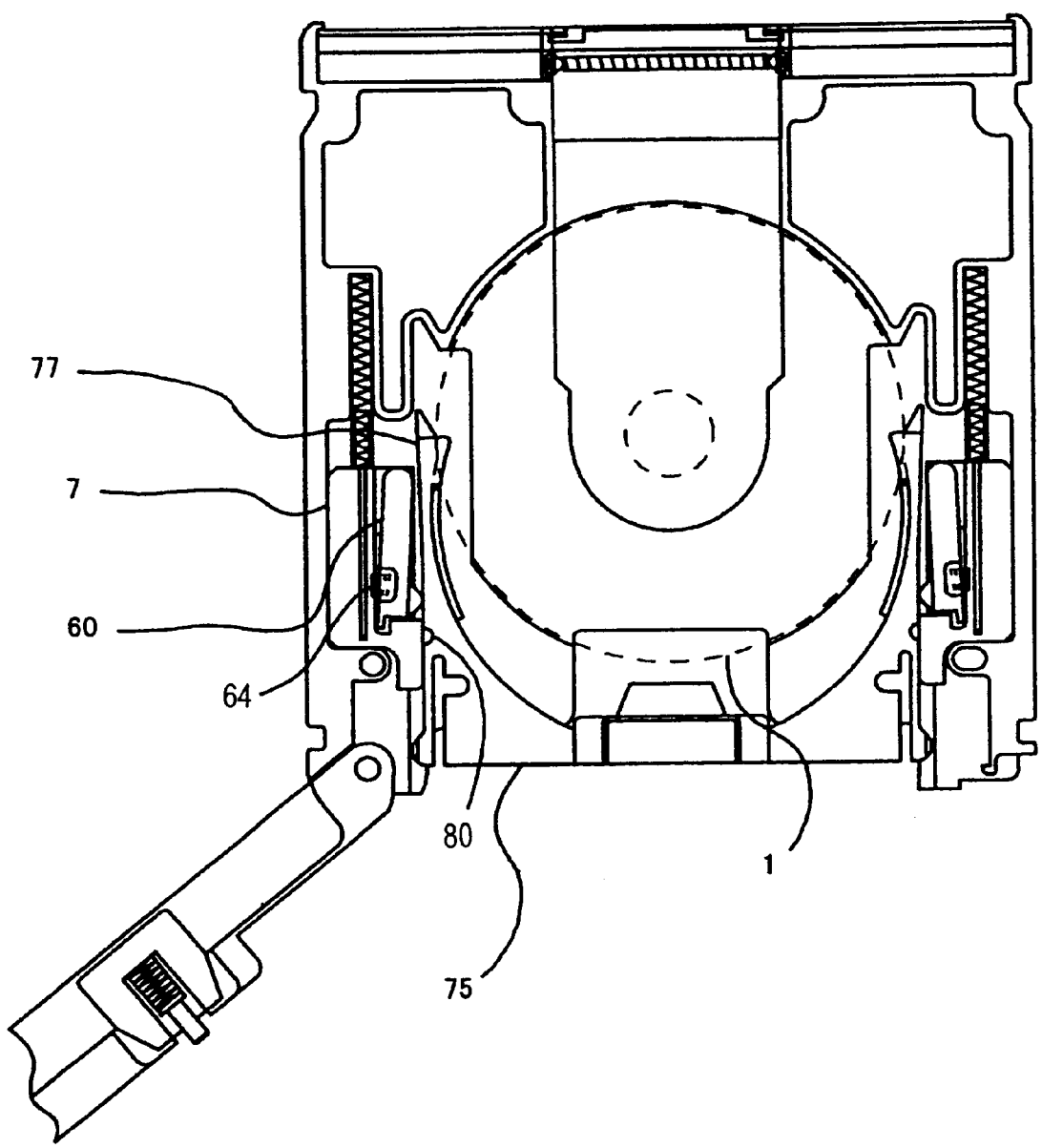
FIG. 9 is a view of the disc cartridge adaptor of the present invention with a disc housed therein and a disc holder inserted halfway.

First, the disc 1 is inserted into the disc cartridge adaptor 2 through the opening 16 to be housed in the case body 3. Then, as shown in FIG. 9, the disc holder 75 is pushed into the case body 3 so that it passes between the movable members 7 disposed on both sides of the disc cartridge adaptor 2 toward the deep of the case body 3. In the course of the passing, the inner side faces of the top ends of the disc supports 77 come into contact with the circumference of the disc 1. The disc supports 77 are elastically deformed and continue passing along the circumference of the disc 1. This results in the disc 1 entering the inside of the disc supports 77, and thus the disc holder 75 holds the disc 1. During this passing, the outer sides of the disc supports 77 are elastically deformed outward with respect to the case body 3. Therefore, the movable members 7 need to be placed at positions free from contact with the disc supports 77.

Figure 13:
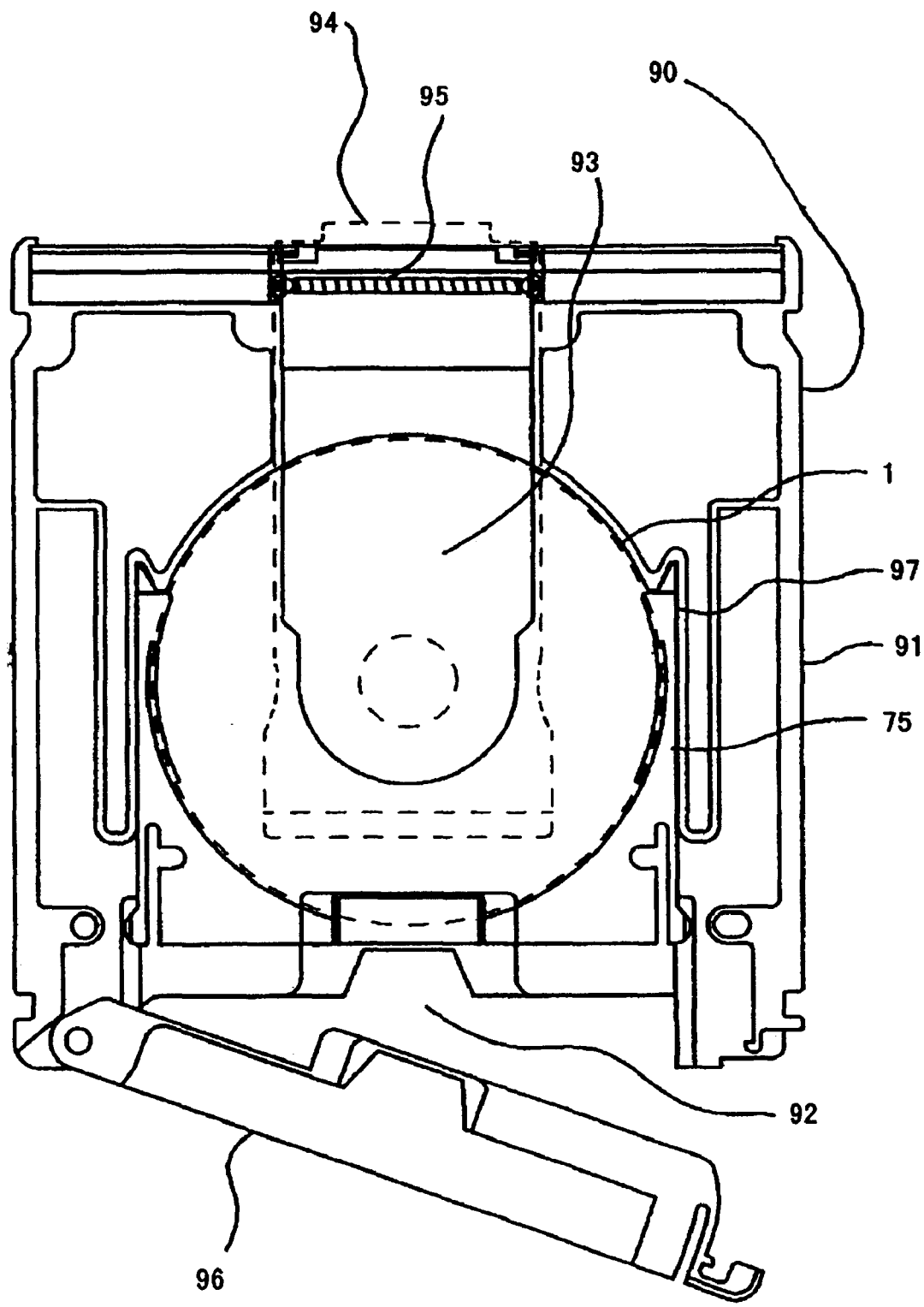
FIG. 13 is a view of a disc cartridge adaptor in which a disc and a disc holder shown in FIGS. 11 and 12 are housed.

In this embodiment, the guide wall 97 as shown in FIG. 13 is not required.

Referring to FIG. 6, a gap d may be given between the outer sides of the disc supports 77 and the movable members 7. With this gap, the disc supports 77 can pass along the disc 1 while being elastically deformed. The other operation is the same as the operation of inserting the disc holder 75 holding the disc 1 into the disc cartridge adaptor 2 described above. Detailed description is therefore omitted here.

The resultant disc cartridge adaptor 2 is inserted into a disc drive intended for a large-size disc cartridge. During the insertion, the shutter 4 slides to open the exposing portion 17 allowing an optical head to enter through the exposing portion 17 for recording, reproduction, and erasing of various types of information.

Next, the operation of removing the disc holder 75 and the disc 1 from the disc cartridge adaptor 2 will be described.

First, the press portion 33 is pressed. This elastically deforms the protrusion 32, releasing the locking between the lock portion 19 of the case body 3 and the protrusion 32 and thus permitting pivoting of the lid 6. Upon release of the locking, the lid 6, the disc holder 75, the disc 1, and the movable members 7 start moving with the urging force of the elastic members 55. The movable members 7 move along the guide grooves 14 of the case body 3, and when the movement has been completed, the disc holder 75 and the disc 1 have moved by the amount of the movement of the movable members 7. Along with this movement, the lid 6 has pivoted by the amount of the movement of the movable members 7 in a direction apart from the case body 3.

The lid 6 is then further opened to reach a position permitting removal of the disc holder 75 from the case body 3. The disc holder 75 and the disc 1 are then removed. The removed disc holder 75 and the disc 1 are then inserted into the disc cartridge 70 to resume the original state. In this way, the disc 1 is now ready for use in a disc drive intended for a small-size disc cartridge for recording, reproduction, and erasing of various types of information.

As described above, in this embodiment, the movable member 7 guides the insertion of the disc holder 75 into the disc cartridge adaptor 2. Therefore, the disc holder 75 can be inserted into the disc cartridge adaptor 2 after the disc 1 alone taken out from the disc holder 75 has been housed in the disc cartridge adaptor 2. The resultant disc cartridge adaptor 2 can be used without causing any trouble.

In this embodiment, the disc 1 may be a RAM or ROM disc having an outer diameter of 80 mm, and the large-size disc cartridge may be a disc cartridge for a disc having an outer diameter of 120 mm. In this case, by inserting a disc having an outer diameter of 80 mm available in a bare form (for example, a single compact disc) into the disc cartridge adaptor 2, the disc can be used in a disc drive intended for the large-size disc cartridge.

In this embodiment, even when the disc 1 alone is inserted into the disc cartridge adaptor 2, the disc 1 can be rotatably positioned with the partition wall 12 of the case body 3 and the positioning pin 41 protruding from the lid 6. Therefore, the disc 1 can be used without causing any trouble.

In this embodiment, the grasp protrusions 63 of the movable members 7 engage with the cuts 80 of the disc holder 75. This prevents the disc holder 75 and the disc 1 from dropping off from the disc cartridge adaptor 2 when the disc holder 75 holding the disc 1 is inserted into the disc cartridge adaptor 2. This improves reliability and operability.

In this embodiment, a compression coil spring is used as the elastic members and the press members. The elastic members and the press members used in the present invention are not restricted to this spring but may be made of a leaf spring, rubber, or the like as long as a predetermined urging force is provided.

The type of the disc used in the present invention is not specifically restricted, but may be an optical disc or a magnetic disc, for example.

Thus, according to the present invention, the following can be attained using one disc cartridge adaptor.

A disc holder and a disc held by the disc holder are simultaneously inserted into the disc cartridge adaptor, for use in a disc drive.

A disc is first inserted into the disc cartridge adaptor, and then a disc holder is inserted, for use in a disc drive.

A disc alone is inserted into the disc cartridge adaptor, for used in a disc drive.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

We claim:

1. A disc cartridge adaptor for housing a disc and a disc holder holding at least part of the disc, the disc holder being removably housed in a disc cartridge case, the disc cartridge adaptor comprising:

a case body including
 a housing portion for rotatably housing the disc, the housing portion being able to house the disc together with the disc holder or without the disc holder
 an exposing portion for exposing at least part of a recording surface of the housed disc, and
 an opening communicating with the housing portion for allowing insertion and removal of the disc holder and the disc; and
a lid pivotably supported by the case body, the lid being able to block the opening,
wherein the lid includes disc positioning means having a positioning member movable between a first position and a second position with respect to the lid, and
the positioning member is in the first position restricting the position of the disc within a predetermined range when the disc is housed in the housing portion without the disc holder, and retreats to the second position when the disc holder is housed in the housing portion.

2. The disc cartridge adaptor of claim 1, wherein the disc positioning means has an elastic member urging the positioning member toward the first position from the second position.

3. The disc cartridge adaptor of claim 2, wherein the positioning member is at least one pin movably supported by the lid.

4. The disc cartridge adaptor of claim 1, wherein the first position is determined so that a gap is formed between the positioning member and the disc when the disc is housed in the housing portion without the disc holder and rotated with a disc drive.

5. The disc cartridge adaptor of claim 1, wherein the top end of the positioning member has been moved backward from the first position by the disc holder when the disc holder is housed in the housing portion and the lid closes the opening of the case body.

6. The disc cartridge adaptor of claim 1, wherein the case body includes a pair of movable members movable in a direction of insertion of the disc, and
the movable members can grasp the disc holder inserted into the case body.

7. The disc cartridge adaptor of claim 6, wherein each of the movable members has a pivot plate having a protrusion engaging with a recess formed on a side face of the disc holder, and
when the disc holder is inserted into the case body beyond a predetermined distance, the engagement between the protrusion of the movable member and the recess of the disc holder is established by operation of the pivot plate.

8. The disc cartridge adaptor of claim 6, wherein the movable member has an elastic member urging the movable member in a direction opposite to the direction of insertion of the disc, and
the elastic member urges the disc holder grasped by the movable member when the disc holder is removed from the case body.

9. The disc cartridge adaptor of claim 1, wherein the case body includes a press member for pressing the disc holder toward either one of principal surfaces of the case body for positioning of the disc holder.

10. The disc cartridge adaptor of claim 1, wherein the housing portion of the case body has a shape and size capable of housing a disc having a diameter of 80 mm, and
the outside shape and size of the case body is substantially the same as the shape and size of a disc cartridge capable of housing a disc having a diameter of 120 mm.

11. The disc cartridge adaptor of claim 1, wherein the case body has means for preventing the disc holder from being inserted upside-down into the case body.

* * * * *